United States Patent [19]
Petersen et al.

[11] Patent Number: 5,977,528
[45] Date of Patent: Nov. 2, 1999

[54] RECTANGULAR MICROWAVE APPLICATOR AND WASTE TREATMENT METHOD

[75] Inventors: Robert D. Petersen, Knoxville; J. Aubrey Beck, Jr., Oak Ridge; Harold D. Kimrey, Jr.; Alois F. Sferrazza, both of Knoxville, all of Tenn.

[73] Assignee: EET Corporation, Knoxville, Tenn.

[21] Appl. No.: 08/948,446

[22] Filed: Oct. 10, 1997

[51] Int. Cl.⁶ .................................................... H05B 6/78
[52] U.S. Cl. ...................... 219/690; 219/693; 219/696; 219/753
[58] Field of Search ................................... 219/678, 690, 219/691, 693, 695, 696, 697, 698, 699, 738, 745, 752, 753, 754, 762

[56] References Cited

U.S. PATENT DOCUMENTS

| | | | |
|---|---|---|---|
| 3,597,565 | 8/1971 | Johnson | 219/696 |
| 4,940,865 | 7/1990 | Johnson et al. | 219/753 |
| 5,324,485 | 6/1994 | White | 422/159 |

Primary Examiner—Tu Ba Hoang
Attorney, Agent, or Firm—Pitts & Brittian, P.C.

[57] ABSTRACT

A rectangular microwave applicator for processing waste material. The rectangular microwave applicator generally includes an upper cavity and a waste container. The upper cavity defines side walls and a ceiling, the bottom of the upper cavity is open. A screwfeeder tube is positioned on and extends through one of the side walls, and a vent is positioned on and extends through another of the side walls. The waste container is rectangular in configuration and is receivable in the bottom of the upper cavity. The waste container holds waste material which is introduced therein via the screwfeeder tube. A microwave choke is carried across the bottom of the upper cavity and is configured to permit the entrance of the waste container in the bottom of the upper cavity. A microwave energy input is at each corner on top of the ceiling of upper cavity and extends therethrough. Each of the corner microwave energy inputs delivers microwave energy to waste material in the corners of the waste container and is configured to transform a rectangular waveguide to a circular waveguide to maintain microwave energy in the corners of the waste container for effective heating of the waste material.

6 Claims, 3 Drawing Sheets

5,977,528

RECTANGULAR MICROWAVE APPLICATOR AND WASTE TREATMENT METHOD

TECHNICAL FIELD

This invention relates to the field of waste treatment and more specifically to the treatment of inorganic waste using microwave energy.

BACKGROUND ART

Microwave heating of radioactive waste material is a well known means for treating radioactive waste such that the resulting wasteform can be stored safely. Several earlier attempts at microwave energy treatment of waste material included devices with moving parts and bearings which were prone to wear and corrosion. Further, prior art treatment methods created glass or vitreous wasteforms which are sensitive to changes in waste feed chemical composition.

More recently, microwave energy treatment devices which utilize in-drum processing have been developed. In particular, U.S. Pat. Nos. 4,940,865 and 5,324,485 disclose devices where waste material is deposited into a container and microwave energy heats the waste material to a molten state. The waste material upon cooling solidifies into a wasteform which can be safely stored. The '865 patent utilizes a turntable for rotating a waste drum. The turntable is subject to failure thereby affecting the uniform heating of the waste. Moreover, neither patent addresses the problem of microwave leakage sufficiently. Also, the microwave energy transfer to the waste is not maximized.

Therefore, it is an object of the present invention to provide a microwave applicator and waste treatment method which provides a greater energy transfer efficiency than apparatus of the prior art.

It is another object of the present invention to provide a microwave applicator and waste treatment method wherein the final form defines a crystalline structure.

Further, it is an object of the present invention to provide a microwave applicator constructed in a manner such that the heat generated during the process is confined to a disposal container.

Moreover, it is an object of the present invention to provide a microwave applicator which is designed to minimize microwave leakage.

It is yet another object of the present invention to provide a microwave applicator which provides uniform heating and melting of the waste.

It is also an object of the present invention to provide a near-uniform heating of waste material in a rectangular configuration.

It is an object of the present invention to enable a waste solidification using microwave energy in a vessel of rectangular configuration and increasing the packing efficiency of the final waste form for disposal.

SUMMARY

Other objects and advantages will be accomplished by the present invention which is a rectangular microwave applicator for processing waste material. The microwave applicator of the present invention generally includes an upper cavity and a waste container. The upper cavity defines side walls and a ceiling, the bottom of the upper cavity is open. A means for feeding waste into the waste container is included and in the preferred embodiment, a screwfeeder tube is positioned on and extends through one of the side walls, and a vent is positioned on and extends through another of the side walls. The waste container is rectangular in configuration and is receivable in the bottom of the upper cavity. The waste container holds waste material which is introduced therein via the screwfeeder tube. A microwave choke is carried across the bottom of the upper cavity and is configured to permit the entrance of the waste container in the bottom of the upper cavity. A microwave energy input is at each corner on top of the ceiling of upper cavity and extends therethrough. Each of the corner microwave energy inputs delivers microwave energy to waste material in the corners of the waste container and is configured to transform a rectangular waveguide to a circular waveguide to maintain microwave energy in the corners of the waste container for effective heating of the waste material.

BRIEF DESCRIPTION OF THE DRAWINGS

The above mentioned features of the invention will become more clearly understood from the following detailed description of the invention read together with the drawings in which.

DESCRIPTION OF PREFERRED EMBODIMENTS

A microwave applicator incorporating various features of the present invention is illustrated generally at 10 in the figures. The microwave applicator 10 is designed to produce a crystalline final waste form from inorganic waste using microwave energy. Moreover, in the preferred embodiment, the applicator 10 is designed to provide greater energy transfer efficiency than devices of the prior art. Also, the applicator 10 provides a means for limiting microwave leakage. Further, the applicator 10 provides a means for uniform heating and melting of waste and enables processing in a rectangular vessel.

Figure 1:
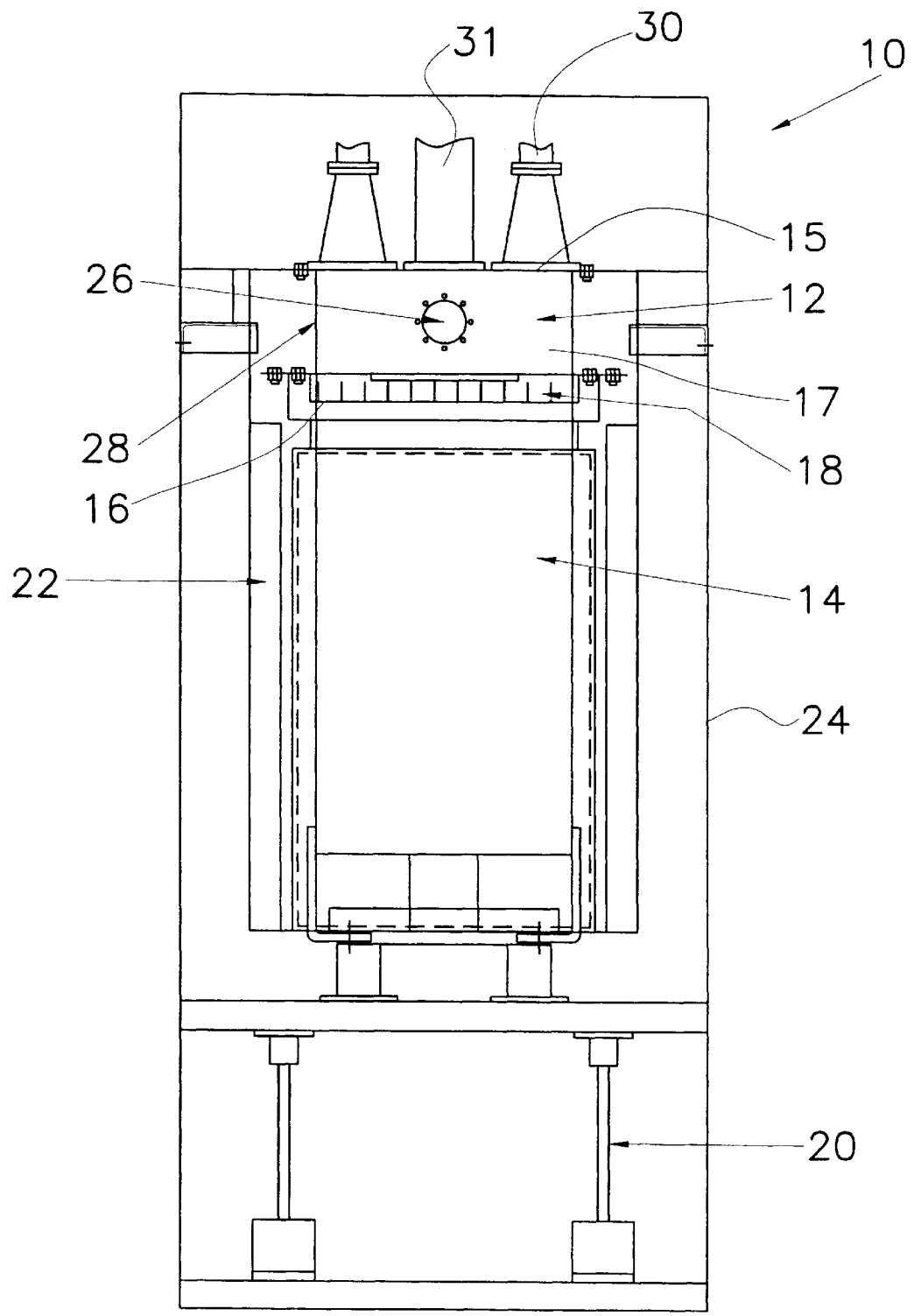
FIG. 1 is a perspective view of the rectangular microwave applicator constructed in accordance with several features of the present invention.

The microwave applicator 10 is generally comprised of two separate sections, an upper cavity 12 and a waste container 14, as shown in FIG. 1. The upper cavity 12 is a rectangular metal box including a ceiling 15 and side walls 17. The bottom 16 of the upper cavity 12 is open. The waste container 14 forms the lower section of the applicator 10 and is rectangular in configuration, as shown in FIG. 1. The waste container 14 is configured to be insertable into the open bottom 16 of the upper cavity 12. A microwave choke 18 is carried at the lower end of the upper cavity 12 and is configured to permit the insertion of the waste container 14 into the upper cavity 12 without contact, as shown in FIG. 1. In the preferred embodiment, the waste container 14 is supported on a lift table 20 for raising and lowering the waste container 14. Further, in the preferred embodiment, the upper cavity 12 and the waste container 14 are surrounded by an insulation barrier 22 and an outer metal box 24 surrounds the insulation barrier 22 and the lift table 20.

The upper cavity 12 defines a waste feeder 25, a vent 28 and at least one microwave energy input 30. Preferably, the waste feeder 25 is a screwfeeder tube 26 which is located at a side wall 32 of the upper cavity 12 and extends through the side wall 32 and 4 inches into the upper cavity 12. Waste is introduced into the waste container 14 via the screwfeeder 26. It will be noted that other means for feeding waste can be used including a vibratory feeder, gravity feed, a rotary calciner, etc. The vent 28 is positioned in a side wall adjacent to the side wall through which the waste is introduced and provides an outlet for offgas generated during the processing of the waste.

Figure 2:
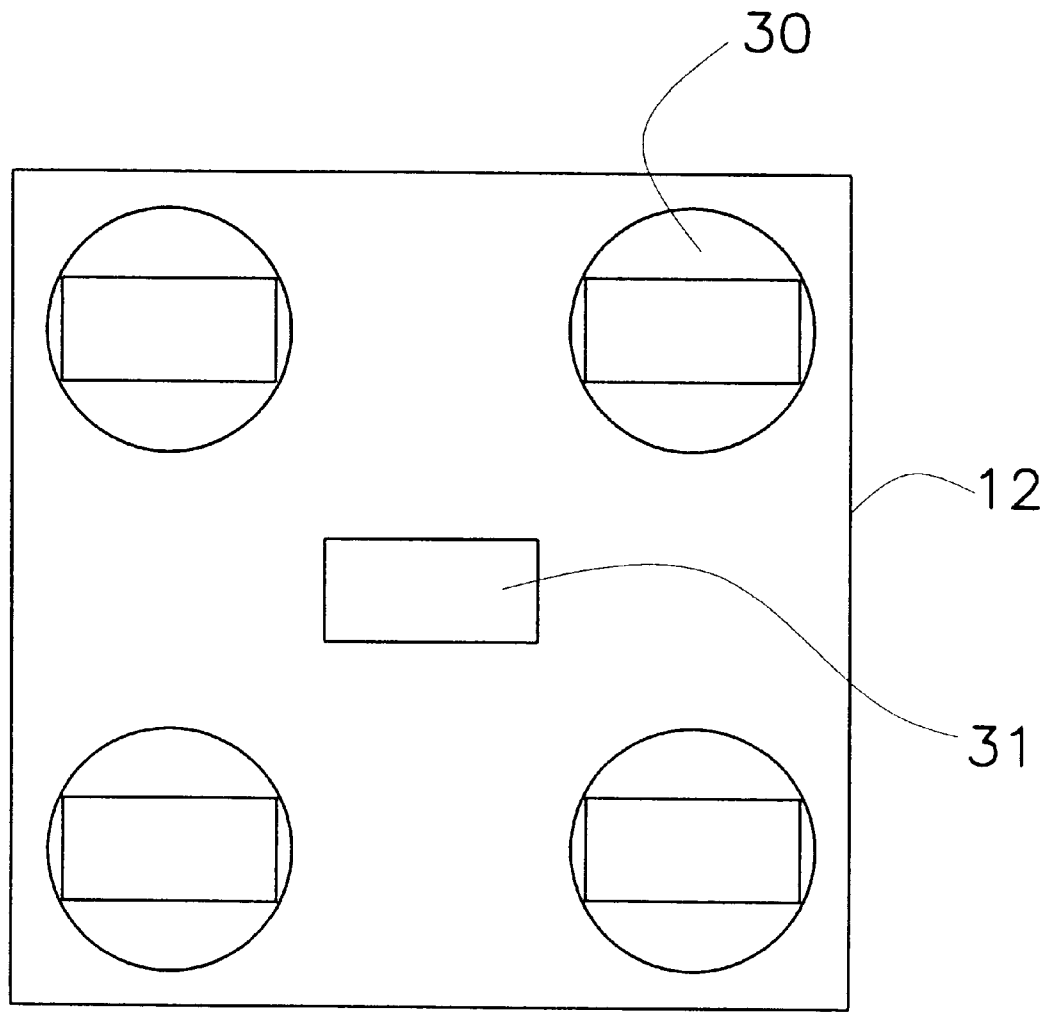
FIG. 2 illustrates a top view of the upper cavity.

The microwave energy input 30 extends through the top of the upper cavity 12 and a microwave source (not shown) introduces microwave energy into the upper cavity 12 via the microwave energy input 30. Preferably, the upper cavity 12 includes five microwave energy inputs 30. One microwave source can be associated with each input 30, one microwave source can be associated with all five inputs 30, or any other combination, for example, two microwave sources for five inputs. A microwave energy input 30 is positioned at each corner and at the center of the upper cavity 12, shown most clearly in FIG. 2. This configuration allows for uniform heating and melting of the waste within the waste container 14. The microwave energy inputs 30 are configured to direct energy preferentially into the corners to offset heat losses which occur there. The energy inputs 30 positioned in the corners are constructed such that the microwave energy injected into the corners of the waste container 14 will match the boundary conditions at the corners. This is facilitated by a rectangular to circular waveguide transition 44 located as close to the corner of the waste container 14 as feasible. The microwave inputs 30 positioned at the corners define a configuration which converts a rectangular waveguide to a circular waveguide. Specifically, each of the microwave inputs 30 positioned at the corners of the upper cavity 12 defines a rectangular configuration at its upper end 46 and a circular configuration at its lower end 48, as shown in FIG. 2. At the junction between the circular waveguide and the waste container 14, the microwave energy boundary conditions are nearly satisfied. This causes the microwave energy to stay near the corners of the waste container 14 for effective heating of the waste product in the corners. The center microwave input 31 provides additional microwave energy for a uniform melt product. In the preferred embodiment, the microwave source provides a frequency of 2450 megahertz.

Figure 3:
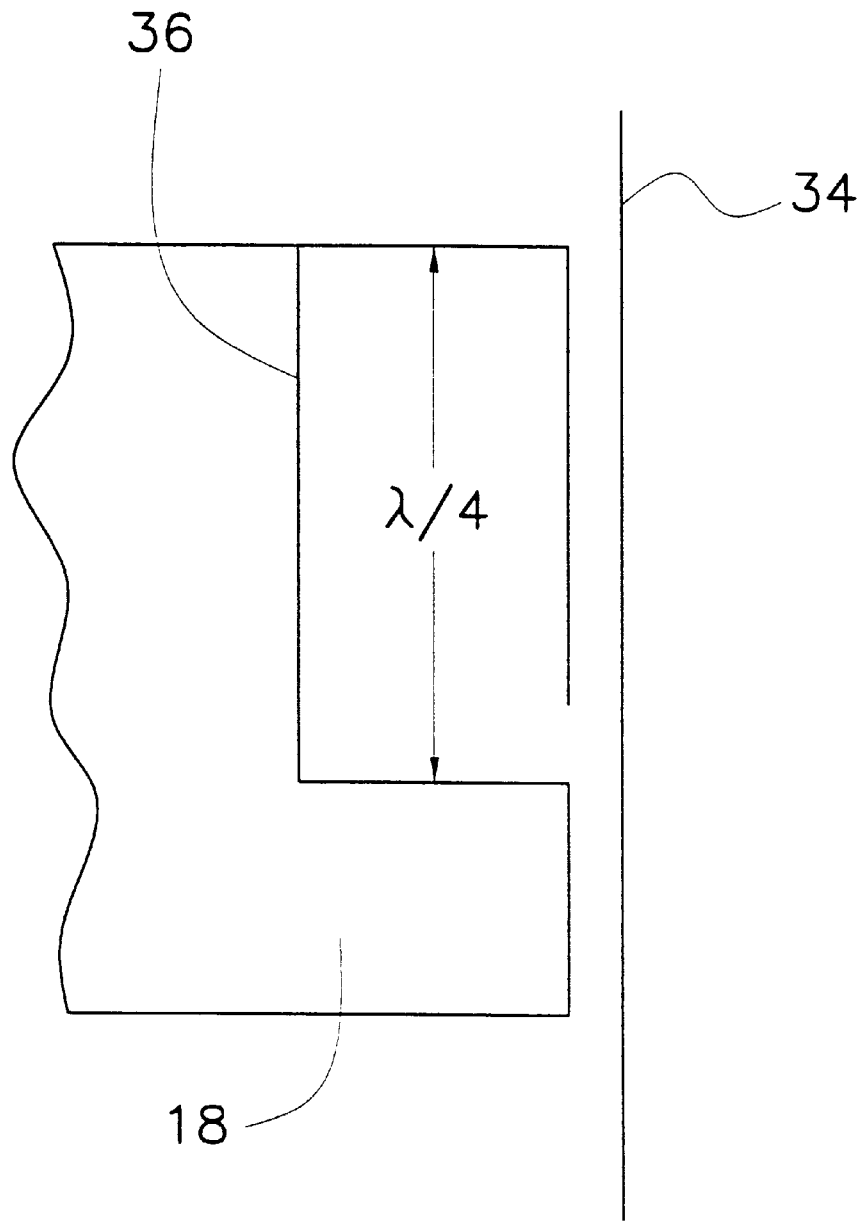
FIG. 3 is a view of the microwave choke.

The microwave choke 18 is designed to preclude excessive microwave leakage outside the waste container 14 and its configuration is well known in the art. The microwave choke 18 defines a noncontact design which allows free access of the waste container 14 into and out of the upper cavity 12 and specifically, the arrangement allows vertical movement of the waste container 14 approximately ¼ to ½ wavelength into the upper cavity 12. A detailed view of a portion of the choke 18 is illustrated in FIG. 3. The choke includes two separate sheet metal sections which form low and high impedance waveguide sections 34, 36, as shown in FIG. 3. Each of these sections is designed to be ¼ wavelength at the operating frequency of the microwave system.

In operation of the rectangular microwave applicator 10, the waste container 14 is placed on the lift table 20 and elevated through the choke 18 and into the upper cavity 12. A predetermined quantity of waste is fed into the waste container 14 via the screwfeeder tube 26. Microwave energy is applied to the waste via the microwave energy inputs 30 to initiate melting. After the initial charge is molten, continuous feeding is started. The waste container 14 can be moved vertically up or down ¼ to ½ of a wavelength to assist in "tuning" the system. When the waste container 14 is filled, the feed and energy are discontinued and the waste container 14 is lowered to disengage the upper cavity 12.

It will be noted that the silica content in the waste material forms a crystalline structure when melted via the microwave energy such that a crystalline wasteform results. Silica is added to the waste material when the silica content of the waste material is not sufficient to produce a crystalline waste form.

Studies have been conducted on surrogate sludges representing low-level filtercake from a wastewater treatment facility and generic surrogates representing waste water treatment sludges that can be either hazardous or mixed. These wastes are predominately calcium-magnesium carbonate sludges with minor amounts of sodium, aluminum, and iron. Materials were processed in a rectangular 2.45 GHz microwave applicator using an 80 weight percent waste loading, 5 weight percent iron and 15 weight percent silica as additives, to produce a final waste form with a density of 3.26 g/cc and a volume reduction of 8:1. The following mineral assemblage was identified using x-ray diffraction and petrographic microscopy: akermanite ($Ca_2MgSi_2O_7$), merwinite ($Ca_3<g(SiO_4)_2$), monticellite ($CaMgSiO_4$), quartz ($SiO_2$), and magnetite ($Fe_3O_4$).

From the foregoing description, it will be recognized by those skilled in the art that a rectangular microwave applicator offering advantages over the prior art has been provided. Specifically, the microwave applicator provides greater energy transfer efficiency and uniform heating and melting of the waste. Further, the applicator is designed to confine heat generated during the process to the waste container and to minimize microwave leakage. Moreover, the final waste form defines a crystalline structure. Also, the rectangular block geometry of the final waste form provides disposal efficiency by eliminating or minimizing void spaces between disposal containers.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A rectangular microwave applicator for processing waste material comprising:

an upper cavity defining side walls and a ceiling, a bottom of said upper cavity being open, said upper cavity including a waste feeder and a vent, said vent being positioned on and extending through another of said side walls;

a waste container defining a rectangular configuration and being receivable in said bottom of said upper cavity, said waste container for holding waste material which is introduced via said waste feeder;

a microwave choke carried across said bottom of said upper cavity, said microwave choke being configured to permit entrance of said waste container in said bottom of said upper cavity; and, a plurality of microwave energy inputs carried on and extending through said ceiling of said upper cavity, each of said microwave energy inputs being positioned at a corner of said upper cavity for delivering microwave energy to waste material in the corners of said waste container, each of said microwave energy inputs being configured to transform a rectangular waveguide to a circular waveguide to maintain microwave energy in the corners of said waste container for effective heating of the waste material.

2. The rectangular microwave applicator of claim 1 further including a lift table for lifting and lowering said waste container in and out of said upper cavity.

3. The rectangular microwave applicator of claim 1 further including a central microwave energy input carried on and extending through said ceiling of said upper cavity at a central location for providing microwave energy to waste material in said waste container.

4. The rectangular microwave applicator of claim 1 wherein said waste feeder is a screwfeeder tube being positioned on and extending through one of said side walls of said upper cavity.

5. A rectangular microwave applicator for processing waste material comprising:

an upper cavity defining side walls and a ceiling, a bottom of said upper cavity being open, said upper cavity including a waste feeder and a vent, said vent being positioned on and extending through another of said side walls;

a waste container defining a rectangular configuration and being receivable in said bottom of said upper cavity, said waste container for holding waste material which is introduced via said waste feeder;

a microwave choke carried across said bottom of said upper cavity, said microwave choke being configured to permit entrance of said waste container in said bottom of said upper cavity;

a plurality of microwave energy inputs carried on and extending through said ceiling of said upper cavity, each of said microwave energy inputs being positioned at a corner of said upper cavity for delivering microwave energy to waste material in the corners of said waste container, each of said microwave energy inputs being configured to transform a rectangular waveguide to a circular waveguide to maintain microwave energy in the corners of said waste container for effective heating of the waste material;

a central microwave energy input carried on and extending through said ceiling of said upper cavity at a central location for providing microwave energy to waste material in said waste container; and, a lift table for lifting and lowering said waste container in and out of said upper cavity.

6. The rectangular microwave applicator of claim 5 wherein said waste feeder is a screwfeeder tube being positioned on and extending through one of said side walls of said upper cavity.

* * * * *